United States Patent [19]

Hesse et al.

[11] 3,988,386

[45] Oct. 26, 1976

[54] SYNTHETIC RESINS

[75] Inventors: Wolfgang Hesse; Gisbert Moller, both of Weisbaden, Germany

[73] Assignee: Hoechst Aktiengesellschaft, Frankfurt, Germany

[22] Filed: July 16, 1973

[21] Appl. No.: 379,494

[30] Foreign Application Priority Data
July 17, 1972 Germany............................ 2235051

[52] U.S. Cl............................... 260/831; 260/3.3; 260/53 R; 260/57 R; 260/57 A; 260/57 C; 260/59 E P; 260/838; 260/842; 260/843; 260/844; 260/845

[51] Int. Cl.$^2$...................... C08G 8/08; C08L 63/00

[58] Field of Search................ 260/838, 53 R, 57 A, 260/57 R, 57 C, 59 EP, 831, 842, 843, 844, 845, 3.3

[56] References Cited
UNITED STATES PATENTS

| | | | |
|---|---|---|---|
| 2,321,783 | 6/1943 | Webber et al. | 260/838 |
| 2,809,178 | 10/1957 | Turner et al. | 260/57 A |
| 3,053,807 | 9/1962 | Lederman et al. | 260/57 R |
| 3,226,365 | 12/1965 | Yamamoto et al. | 260/57 A |
| 3,410,718 | 11/1968 | Smith | 260/838 |
| 3,518,159 | 6/1970 | Freeman et al. | 260/838 |

*Primary Examiner*—J. Ziegler
*Attorney, Agent, or Firm*—Littlepage, Quaintance, Murphy & Dobyns

[57] ABSTRACT

A process for the preparation of light color, odor free novolaks which have high melting points, high condensation levels, good solubility and uniform compositions which comprises reacting in at least one stage a) at least one alkyl-free phenol, b) at least one condensation product of formaldehyde and at least one alkyl phenol, the said condensation product containing at least one member selected from the group consisting methylol groups and methylene ether linkages, and c) less than one mole of formaldehyde calculated on the basis of the total number of moles of phenol and alkyl phenol present and including the formaldehyde already present in the alkyl phenol-formaldehyde condensation product, in the presence of an acid catalyst, such that the ratio of the product of (moles of alkyl phenol × number of carbon atoms in the alkyl radicals of the alkyl phenol)/(the total molar number of phenolic hydroxy groups in the starting materials) is from (0.6 to 1.25):1; a novolak which is obtained by the process and binding compositions containing said novolak.

13 Claims, No Drawings

SYNTHETIC RESINS

The present invention is concerned with a new process for the preparation of novolaks.

Novolaks are thermoplastic condensation products of phenols with aldehydes joined together by alkylidene bridges. They are used as moulding materials and have many other uses, particularly in the printing and lacquer fields. The solubilities of novolaks in various solvents and the speed with which the solvent is given off as well as other properties give rise to their wide application. Such properties are dependent on the nature of the starting materials and on the condensation level in the novolak as indicated by the melting point and viscosity.

Of particular importance in the printing and lacquer fields are cresol novolaks, i.e. those obtained by condensation of an isometric mixture of cresols often containing up to 30% of the six isomers of xylenol with formaldehyde in the presence of organic acids. By selecting cresol mixtures with a suitable isomer ratio novolaks with a high condensation level may be obtained which were hitherto not obtainable from other starting materials. These novolaks have high melting points and allow rapid release of solvents. The methyl group of the cresol moiety gives rise to solubilities in solvents, plastics and resins as well as in inorganic media such as alkalis or solutions of alkaline reacting salts appropriate for the intended application.

This advantageous combination of properties of the cresol novolaks is not possessed by novolaks produced from unsubstituted phenol and formaldehyde, the condensation level obtainable being too low. Furthermore alkylphenyl novolaks do not have the desired solubility and compatibility characteristics and as a result of cyclisation reactions they have only very limited condensation levels. Novolaks prepared from diphenylolpropane and formaldehyde, which otherwise have many advantages relative to other novolaks, cannot be used as substitutes for cresol novolaks. The solvent is given off too slowly and the solubility and compatibility properties are not equal to those of novolaks of nonsubstituted phenols despite the presence of isopropylidene groups.

However, as well as their favourable properties, cresol novolaks have disadvantages which restrict their possible applications. Firstly they have a characteristic dark colour, the Hellige tinting value varying from 40 to 120. More important however is the powerful and all pervading smell of cresol which limits their use as printing inks for packages for foodstuffs or as varnishes for use in inhabited rooms. Therefore the use of cresol novolaks is severely limited. In addition there are difficulties in the production of cresol novolaks because variations in the composition of the cresol isomer mixture, which can only be determined with difficulty, can give rise to undesirable properties. It must also be remembered that the isomer mixtures used are by-products in the production of pure isomers or other isomer mixtures and producers thereof are often unable or only able with difficulty to continue to provide the mixture with the requisite composition following a change to another source of raw materials.

To avoid these problems attempts were made to simultaneously react alkyl phenols, phenol and formaldehyde in the presence of acid catalysts. However this method led to resins which gelled with only a small amount of formaldehyde, had large quantities of unreacted alkyl phenol present and low condensation levels and also were obtained with considerable turbidity.

It has now been found that reacting together a) an alkyl-free phenol, b) the reaction product of formaldehyde and an alkyl phenol and c) formaldehyde in certain proportions in the presence of an acid catalyst yields light-coloured novolaks of uniform composition which no longer smell of cresol but which have the same characteristics as cresol novolaks.

Thus according to one feature of the present invention there is provided a process for the preparation of novolaks which comprises reacting a) at least one alkyl-free phenol, b) at least one condensation product of formaldehyde and an alkyl phenol, the said condensation, product optionally containing methylol groups and methylene ether linkages, and c) less than one mole of formaldehyde calculated on the basis of the total number of moles of phenol, and alkyl phenol present and including the formaldehyde already present in the alkyl phenol-formaldehyde condensation product, in the presence of an acid catalyst, such that the ratio of the product of (mols of alkyl phenol x the number of carbon atoms in the alkyl radicals of the alkyl phenol) to the total molar number of phenolic hydroxy groups in the starting materials is in the range (0.6 to 1.25) : 1.

In a preferred performance of the process according to the invention components a), b) and c) are reacted in such proportions that the ratio of the product of (mols of alkyl phenol x the number of carbon atoms in the alkyl radicals of the alkyl phenol) to the total molar number of phenolic hydroxy groups in the starting materials is in the range (0.8 to 1.1) : 1. Further component b) preferably contains methylene ether linkages or methylol groups capable of condensing together to form methylene ether linkages. Advantageously the condensation product b) is a dimethylol alkyl phenol.

A suitable starting point for the process according to the invention is the preparation of the alkylphenol-formaldehyde condensation product preferably by condensation of 1 to 2 mols of formaldehyde per mol of alkyl phenol in the presence of 0.025 to 1.0 mols of an alkali, for example an alkali metal hydroxide, at temperatures of from room temperature to 70° C optionally in the presence of a solvent such as toluene or xylene. The dimethylol compounds can be used as such or in the form of their auto-etherification products. The conversion of the methylol groups into dimethylene ether bridges is recommended if the methylol compound is to be stored prior to the reaction e.g. in solution. Storage at relatively low temperatures, for example at room temperature or below, is preferred because the polyether then sometimes crystallises. In addition the polyether solution can easily be freed from salts by filtration.

Suitable alkyl phenols for the preparation of the methylol compounds are those with 3 to 12, preferably 4 to 9, carbon atoms in the alkyl group, for example propyl, butyl, amyl, hexyl, heptyl, octyl, nonyl, decyl and docecylphenols, particularly those wherein the alkyl group is in the p-position. p-tert.-Butyl phenol is especially preferred. The term "alkyl phenol" is intended to cover those components with cycloalkyl groups, such as cyclohexyl phenol. It is also possible to use alkyl derivatives of polyvalent mono- or polynuclear phenols e.g. alkylated diphenylol propane or diphenylol methane. Methylol compounds of mixtures of alkyl phenols or mixed methylol compounds based on different alkyl phenols with alkyl groups of varying chain-length and/or varying structure e.g. iso- and n-alkyl groups, may also be used. By varying the length and structure of the alkyl chains or by using mixed starting materials the compatibility of the end products with solvents or with other resins can be modified. For example, the solubility of the novolak in aqueous media is reduced by using methylol compounds with longer alkyl chains. Conversely, shorter alkyl chains improve the solubility.

Suitable phenol components for the reaction according to the invention are mono- or polyvalent, mono- or polynuclear phenols, such as phenol and bisphenols, such as diphenylolpropane, diphenylolmethane and triphenylolethane.

It is convenient to substitute formaldehyde-producing substances, such as paraformaldehyde, or trioxan, for free formaldehyde.

Suitable acid catalysts for the process according to the invention are organic acids and acid anhydrides therefrom and phosphoric acid. Preferred organic acids include oxalic acid, fumaric acid, maleic acid, phthalic acid, tartaric acid, and trichloroacetic acid. The amount of catalyst in the reaction mixture is generally from 0.1 to 5% by weight, preferably 0.5 to 2% based on the total quantity of phenol and alkyl phenol.

The amount of formaldehyde generally used is from 0.7 to 1, preferably 0.8 to 0.95 moles based on the total number of moles of phenol and alkyl phenol whereby the formaldehyde present in the alkyl phenol-formaldehyde condensation product as methylol groups or methylene ether groups must be included.

The preferred molar ratio of the alkyl phenol to the phenol in the reaction mixture is dependent on the number of carbon atoms in the alkyl groups. For example a molar ratio of phenol : p-tert.-butylphenol of from 2 : 1 to 4 : 1, and particularly (2.6 to 3.2) :1 is appropriate. This ratio coincides with the hereinbefore defined ratio of the product of (moles of alkyl phenol × the number of carbon atoms in the alkyl radicals of the alkyl phenol) to the total number of equivalents of phenolic OH groups in the starting materials.

The reaction may, if desired, be performed in the presence of a solvent. Suitable solvents are aromatics such as toluene, xylene, ethylbenzene and/or chlorobenzene. It is thus possible for the alkyl phenol-formaldehyde condensation product, which may or may not contain etherified methylol groups, to be used in the process according to the present invention in the form of a solution in the solvent used for its preparation. However, it is also possible for fresh solvent to be used.

The reaction according to the invention can take place in one of more stages. For complete reaction, the temperature used at least in the closing stages is at least 100° C and advantageously up to 200° C, preferably at least 120° C. For a one-stage process involving the use of phenol (C$_6$H$_5$OH) the use of above atmospheric pressure is recommended in order to obtain an adequately high temperature and avoid phenol losses due to volatilisation. Generally however reaction takes place at normal pressure. Normally the initial stages of the acidic reaction are effected at elevated temperature of up to 100° C until the quantity of free formaldehyde in the acidic reaction mixture has dropped to less than 1% by weight, preferably less than 0.2% by weight. The reaction temperature is then raised to the above indicated range and the reaction is continued under anhydrous conditions e.g. with distilling off of the water formed and return of the solvent until no more water is liberated. The solvent and the non-reacted volatile ingredients of the reaction mixture are then removed for example by distillation under reduced pressure and preferably at temperatures of the reaction mixture of 200° to 260° C.

According to a further feature of the present invention there is provided a novolak resin prepared from a) at least one alkyl-free phenol, b) at least one condensation product of formaldehyde and an alkyl phenol, the said condensation product optionally containing methylol groups and methylene ether linkages, and c) less than one mole of formaldehyde calculated on the basis of the total number of moles of phenol and alkyl phenol present and including the formaldehyde already present in the alkyl phenol-formaldehyde condensation product, the relative proportions of alkyl-free phenol and alkyl phenol in the resin being such that the ratio of the product of (mols of alkyl phenol × the number of carbon atoms in the alkyl radicals of the alkyl phenol) to the total molar number of phenolic hydroxy groups present is in the range (0.8 to 1.1) :, preferably (0.6 to 1.25) : 1.

The novolaks according to the invention are mixed condensates and are light coloured resins without any disturbing natural smell. Their compositions may be regulated so that the resin has the same physical characteristics, for example the compatibility of the resin with solvents or other resins, as corresponding cresol novolaks. This is possible by adjusting the quantity of formaldehyde used or by selecting the appropriate phenol: alkyl phenol ratio as well as by the selection or adjustment of the alkyl substituents of the alkyl phenols. In this way the novolaks can within wide limits be adapted to the desired application. The products according to the invention are, like cresol novolaks, readily compatible with other raw materials for varnishes and/or adhesives such as epoxy resin, alkyd resins, polyvinylacetals, chlorobutadiene rubber and chlorinated rubber. They are also suitable for the production of adhesives.

Like the known cresol novolaks the mixed novolaks produced according to the invention can be used as coating agents e.g. for powder coating and as printing ink binders e.g. for rotogravure and flexogravure printing. Furthermore the mixed novolaks according to the invention can also be used for those purposes where cresol novolaks could not be used due to their dark colour and disadvantageous smell, e.g. for printing packages for the foodstuffs and other articles and for varnishing articles to be used in inhabited rooms.

The following Examples serve to illustrate the process of the present invention and the products therefrom.

The following Table gives the composition of various novolaks prepared according to the process of the present invention. In columns 2 and 3 the number of moles of the phenols and alkyl phenols in the starting mixture is given and in column 4 the sum thereof. From columns 4 and 5 can be calculated the relationship according to column 6. Columns 7 to 9 show the melting point, viscosity and xylene compatibility of the end products. In samples 1 to 7 p-tert.- butylphenol was used as the alkyl phenol; in the sample 8 nonyl phenol; in sample 9 p-cyclopexylphenol; and in sample 10 p-n-hexylphenol.

TABLE 1

| 1 | 2 | 3 | 4 | 5 | 6 | 7 | 8 | 9 |
|---|---|---|---|---|---|---|---|---|
| Product No. | Mols of starting substance | | Total mols of phenol compounds | Alkyl C-atoms × mols of alkyl phenol | Ratio C-atoms (column 5): total mols of phenol | Melting point °C | Viscosity cP | Xylene compatability |
| | Phenol | Alkylphenol | | | | | | |
| 1 Comparison | 8 | 1.0 | 9 | 4 | 0.445 | 104 | 5960 | 1 : 1.1 |
| 2 Comparison | 8 | 1.5 | 9.5 | 6 | 0.63 | 109 | 4700 | 1 : 1.5 |
| 3 | 8 | 2.0 | 10 | 8 | 0.8 | 116 | 2450 | 1 : 2.1 |
| 4 Example 1 | 8 | 2.35 | 10.35 | 9.4 | 0.91 | 119 | 2400 | 1 : 2.3 |
| 5 | 8 | 2.5 | 10.5 | 10 | 0.95 | 118 | 2200 | 1 : 2.6 |
| 6 | 8 | 3.0 | 11 | 12 | 1.09 | 119 | 2020 | 1 : 3.6 |
| 7 | 8 | 4.0 | 12 | 16 | 1.33 | 117 | 1900 | 1 : 4.5 |
| 8 Example 2 | 8 | 1.1 | 9.1 | 9.9 | 1.088 | 98 | 5000 | 1 : 2.5 |
| 9 Example 3 | 8 | 1.7 | 9.7 | 10.2 | 1.051 | 107 | 4700 | 1 : 1.9 |
| 10 Example 4 | 8 | 1.7 | 9.7 | 10.2 | 1.051 | 102 | 4300 | 1 : 2.2 |
| 11 Mixture 1a Comparison | Cresol | (DAB 4) | — | — | — | 119 | 2315 | 1 : (2.2 to 2.4) |

The Table compares the products of samples 3 to 7 (according to the invention) with samples 1 and 2 (comparison). There is a sudden reduction in the viscosity and rise in the melting points of samples 3 to 7 so that the properties of these samples produced according to the invention fall within the range typical for cresol novolaks. Furthermore samples 1 to 7 with increasing content of alkyl phenol show a rise in the hydrophobic character, e.g. an increase in the solubility in aromatic solvents (cf. column 9). Samples 8 to 10 prepared from higher alkyl or cycloalkyl substituted phenols have substantially the same compatibility as the known cresol novalaks (see sample 11, comparisson), but here the melting points are lower and viscosities are higher.

In the following Example where percentages are given they relate to percentages by weight.

EXAMPLE 1

210 g of dimethylol-p-tert.-butylphenol, 320 g of phenol, 150 g of 30% aqueous formaldehyde solution and 6 g of oxalic acid were refluxed with stirring for 6 hours when the content of free formaldehyde was between 0.5 and 0.7%. 72 g of xylene were then added and the mixture mixture was distilled with return of the organic solvent to the reaction vessel. The temperature of the reaction mixture was allowed to rise to 190° C, when about 360 ml of water had been separated and no further water was formed. Subsequently distillation took place initially at normal pressure and then under a gradual reduction in pressure until at 30 mm Hg the reaction temperature was 230° C. The mixture was kept for 2 hours under these conditions and then after cooling to 180° C the mixture was removed from the flask.

92 g of a distillate were obtained together with 465 g of a light yellow novolak with a melting point of 119° C (capillary method), a viscosity of 2400 cP (50% solution in ethylene glycol monoethyl ether/20° C) and a Hellige tinting value of 7. The resin did not have a natural smell and contained less than 0.05% of free phenol and no free p-tert.-butylphenol.

EXAMPLE 1a) (Comparative test)

A cresol resin with the same melting point and analogous viscosity to the novolak of Example 1 was prepared as follows: 1,040 g of cresol DAB 4 (a mixture of 35 parts of m-cresol, 10 parts of o-cresol, 25 g of p-cresol and 20 g of xylenol isomer), 930 g of a 30% aqueous formaldehyde solution and 15 g of oxalic acid were refluxed for 5 hours until the formaldehyde content had dropped below 0.7%. Then 200 parts of xylene were added to the mixture. After working up as in Example 1, 990 g of a light brown cresol novolak with a melting point of 119° C (capillary method), a viscosity of 2315 cP/20° C (1 : 1 ethylene glycol monethyl ether) and a Hellige tinting value of 70 were obtained. The resin smelt of cresol and contained 0.3% of free p-cresol as well as 0.2% of free o-cresol as well as 0.15% of free xylenols.

Printing test

Varnishes containing 40% resin and 60% ethanol were preapred from the resins of Examples 1 and 1a.

Printing inks were produced from 45% of the said varnish, 45% ethanol and 10% of a basic red dye. These aniline rubber printing inks were adjusted to give an outlet time of 24 seconds by adding ethanol to a 4 mm DIN beaker and were applied with a wire coil with a wet film thickness of 6 $\mu$ to natural paper, cardboard (sodium craft paper) and parchment paper.

The bleeding of the dye was tested visually. The smell test was performed with covered samples using several different people who gave conclusive results. The samples were smelt immediately after drying the inks for 60 minutes at 50° C in the drying cupboard.

To determine the speed with which the solvent was given off the resins of Example 1 and comparative Example 1a were 50% dissolved in ethylene glycol monoethyl ester and the solution was applied in the form of films with a 100 $\mu$ wet film thickness to glass plates using a spreading triangle. The printing ink coatings obtained were stored overnight and the lustre was determined by means of the Lange lustre meter.

The results are given in Table 2.

TABLE 2

| Sample | Sample Example 1 (Invention) | Sample 1a (Comparative test) |
|---|---|---|
| Outlet time in sec/23° C (4 mm DIN beaker) | 24.1 | 24.2 |
| Waterproofness according to DIN 16524: | | |
| Dye bleeding Natural paper | 2.0 | 2.0 |
| Cardboard | 2.0 | 2.5 |
| Parchment paper | 0.5 | 1.0 |
| Lange lustre Parchment paper | 48 | 49 |
| Penetration of the dye in natural paper according to DIN 16524 | 2.0 | 2.0 |
| Release time of solvent in min: | | |
| Dry as dust | 20 | 23 |
| Adhesion-free | 52 | 54 |
| Smell (60 minutes at 50° C) | Slight | phenolic |

The printing test gives rather similar results for both samples although the samples according to the invention gave rather better results in the bleeding test. In addition the smell test demonstrated that the cresol resin of the comparative test 1a is unsuitable for use in printing inks for printing foodstuff packages.

EXAMPLE 2

242 g of iso-nonylphenol were dissolved in 110 g of xylene, 200 g of 30% aqueous formaldehyde were added and the mixture was heated to 40° C. 180 g of caustic soda solution (33%) were gradually added with stirring so that the temperature slowly rose to 60° C. The mixture was maintained at this temperature for 5 to 8 hours when the formaldehyde content had fallen to 1.2%. At this point the pH of the mixture was lowered between 4.5 and 4.8 by adding about 90 g of sulphuric acid (50%). The lower aqueous phase was then allowed to settle and was separated. After washing twice with water, 752 g of phenol, 510 g of 30% aqueous formaldehyde and 15 g of oxalic acid were added to the mixture. The mixture was refluxed with stirring until the formaldehyde content had fallen to below 0.3 and 0.7%. 200 g of xylene were then added and the mixture was worked up as in Example 1.

1010 g of a clear, pale yellow, mixed novolak was obtained with a melting point of 98° C and a Hellige tinting value of 9. A 50% solution of this novolak in ethylene glycol monoethyl ether had a compatability with xylene of 1 to 2.5 and a viscosity of 5000 cP/20° C.

EXAMPLE 3

315 g of p-cyclohexylphenol, 340 g of 30% aqueous formaldehyde and 120 g of 33% caustic soda solution were reacted at 60° C analogously to Example 2. After 5 to 8 hours the formaldehyde content had fallen to between 0.4 and 0.7%. The pH of the mixture was adjusted to between 4.5 and 4.8 with about 100 g of 50% sulphuric acid, the aqueous phase was separated and the organic phase was washed twice with distilled water. The mixture was mixed with 752 g of phenol, 390 g of 30% aqueous formaldehyde and 20 g of phthalic anhydride and the condensation was continued as in Example 2. When the formaldehyde content had fallen to between 0.4 and 0.8% a further 200 g of xylene were added and the reaction mixture was then worked up as in Example 2.

1120 g of a clear, pale yellow, mixed novolak were obtained with a melting point of 107° C and a Hellige tinting value of 5. A 50% solution of this novolak in ethylene glycol monoethyl ether had a compatability with xylene of 1 : 1.9 and had a viscosity of 4700 cP/20° C.

EXAMPLE 4

The reaction was effected analogously to Example 3 but p-n-hexylphenol was used in the place of p-cyclohexyl phenol. 1100 g of pale yellow resin were obtained with a melting point of 102° C and a Hellige tinting value of 4. A 50% solution of this resin in ethylene glycol monoethyl had a compatibility with xylene of 1 : 2.2 and had a viscosity of 4300 cP/20° C. It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What we claim is:

1. A process for the preparation of novolaks which comprises reacting in at least one stage at temperatures up to 260° C a) at least one unsubstituted phenol, b) at least one condensation product of formaldehyde and at least one alkyl phenol containing at least 3 carbon atoms in the alkyl substituent, the said condensation product containing at least one member selected from the group consisting of methylol groups and methylene ether linkages and having been prepared in the presence of 0.025 to 1 mole of an alkali at temperatures of from room temperature to 70° C in a molar ratio of formaldehyde to alkyl phenol of from 1-2 : 1 and being substantially freed from unreacted basic materials and c) less than one mole of formaldehyde per mole of phenol calculated on the basis of the total number of moles of unsubstituted phenol and alkyl phenol present and including the formaldehyde already present in the alkyl phenol-formaldehyde condensation product, in the presence of an acid catalyst wherein the quantity of free formaldehyde in the reaction mixture is less than 1% by weight and that the ratio of the product of the number of moles of alkyl phenol multiplied by the number of carbon atoms in the alkyl radicals of the alkyl phenol to the total molar number of phenolic hydroxy groups in the starting materials is in the range from 0.6 to 1.25 : 1.

2. The process of claim 1 wherein the acid catalyst is an organic acid or an acid anhydride therefrom or phosphoric acid and is present in an amount of from 0.1 to 5% by weight based on the total quantity of phenol and alkyl phenol.

3. The process of claim 1 wherein the alkyl phenol-formaldehyde condensation product b) is present in the form of a solution in the solvent used for its preparation.

4. The process of claim 1 wherein component a) is selected from the group consisting of phenol, diphenylolmethane, diphenylolpropane and triphenylolethane and component b) is based on an alkyl phenol.

5. The process of claim 1 wherein the alkyl-free phenol is phenol ($C_6H_5OH$) and the reaction is performed in one stage under increased pressure.

6. The process of claim 1 wherein the alkyl phenol is p-tert.butylphenol and the molar ratio of the alkyl-free phenol a) to the p-tert.butylphenol is from 2:1 to 4:1.

7. The process of claim 1 wherein the amount of formaldehyde present (including the amount present in the alkyl phenol-formaldehyde condensation product as methylol groups or methylene ether groups) is from 0.7 to 1 moles based on the total number of moles of phenol and alkyl phenol.

8. The process of claim 1 wherein component a) is a mono- to tri-hydric, mono- to trinuclear phenol and the condensation product b) is based on at least one alkyl phenol of a mono- to bihydric, mono- to binuclear phenol, the alkyl group thereof having 3 to 12 carbon atoms.

9. The process of claim 1 wherein the reaction is performed in two stages, the reaction temperature of the first stage being up to 70° C and being lower than that of the second, wherein the second stage of the reaction is performed under anhydrous conditions until no more water is liberated.

10. The process of claim 1 wherein the formaldehyde is used in the form of a substance which decomposes to yield formaldehyde selected from the group consisting of paraformaldehyde and trioxane.

11. A novolak resin consisting essentially of a reaction product formed in at least one step by heating at a temperature up to 260° C a) at least on unsubstituted phenol, b) at least one condensation product of formaldehyde and at least one alkyl phenol containing at least 3 carbon atoms in the alkyl substituent, the said condensation product containing at least one member selected from the group consisting of methylol groups and methylene ether linkages and having been prepared in the presence of 0.025 to 1 mole of an alkali at temperatures of from room temperature to 70° C in a molar ratio of formaldehyde to alkyl phenol of from 1-2 : 1 and being substantially freed from unreacted basic materials and c) less than one mole of formaldehyde per mole of phenol calculated on the basis of the total number of moles of phenol and alkyl phenol present and including the formaldehyde already present in the alkyl phenol-formaldehyde condensation product, in the presence of an acid catalyst until the quantity of free formaldehyde in the reaction mixture is less than 1% by weight and such that the ratio of the product of the number of moles of alkyl phenol multiplied by the number of carbon atoms in the alkyl radicals of the alkyl phenol to the total molar number of phenolic hydroxy groups in the starting materials is in the range from 0.6 to 1.25 : 1.

12. A binding composition containing as an essential ingredient the resin of claim 11 together with another synthetic resin selected from the group consisting of an epoxy resin, an alkyd resin, a polyvinyl acetal and chlorinated rubber.

13. A binding composition of claim 12 wherein the said chlorinated rubber is chlorobutadiene rubber.

* * * * *